MAGNETOSTRICTIVE ELEMENT

Filed Sept. 24, 1968

INVENTOR
Lubomyr S. Onyshkevych

BY

ATTORNEY

United States Patent Office 3,582,408
Patented June 1, 1971

3,582,408
MAGNETOSTRICTIVE ELEMENT

Lubomyr S. Onyshkevych, Trenton, N.J., assignor to RCA Corporation

Filed Sept. 24, 1968, Ser. No. 762,048
Int. Cl. H01f *10/02;* G11b *5/00;* G11c *11/14*
U.S. Cl. 148—31.55 7 Claims

ABSTRACT OF THE DISCLOSURE

A magnetostrictive element useful in sonic memory devices comprises a thin film of an alloy comprised of between 40 and 70 weight percent nickel, between 30 and 60 weight percent iron, and from about 0.1 to 14 weight percent manganese.

BACKGROUND OF THE INVENTION

This invention relates to alloys and in particular to thin film alloys for magnetostrictive applications. The invention herein described was made in the course of or under a contract or subcontract thereunder with the Department of the Army.

Magnetostrictive devices are used for the conversion of electrical to magnetic energy and vice versa. They may be used, for example, as transducers in echo-sounding devices, as delay-lines and as sonic memory elements in computers or other memory devices.

A material commonly used as a magnetostrictive element is nickel and nickel alloys. The present invention is based upon the discovery of an improved magnetostrictive element comprised of a nickel alloy, which, because of its high strain sensitivity is particularly suited as a sonic film memory element.

Sonic film memory elements generally should possess high sensitivity to strain, i.e., a high degree of rotation of the easy axis of magnetism for a given applied strain, low threshold values of anisotropy ($H_k$) and easy axis coercive force ($H_c$), good orientation of the easy axis, squareness of the hysteresis loop and high flux density. Prior art magnetostrictive Ni-Fe alloys have been made which possess most of the above properties, however they lack the very high strain sensitivity necessary for practical sonic-film memory devices. A discussion of the use of magnetic thin films in sonic memory devices is given in an article by H. Weinstein et al. appearing in the RCA Review, volume XXVIII (2), pp. 317–343 (1967).

SUMMARY OF THE INVENTION

A magnetostrictive element is comprised of from between about 40 and 70 weight percent nickel, 30 and 60 weight percent iron, and from about 0.1 to 14 weight percent manganese.

PREFERRED EMBODIMENTS OF THE INVENTION

Figure 1:
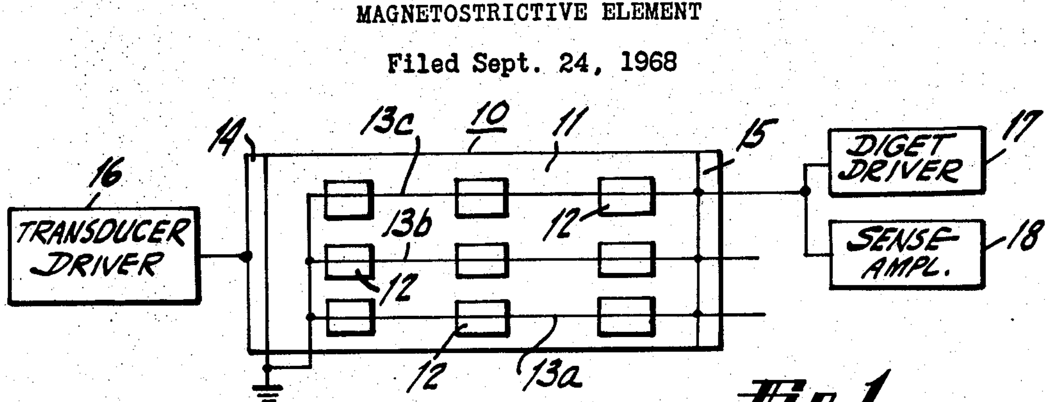
FIGS. 1 and 2 are top and side views respectively of a simple sonic film memory block.
Figure 2:
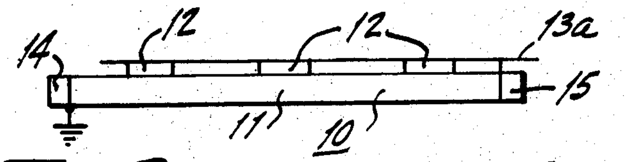

A simple configuration for a sonic film memory block is described with reference to FIGS. 1 and 2. The memory block 10 comprises a glass substrate 11 having a plurality of magnetostrictive elements 12 in the form of magnetic film coatings thereon. The magnetic film coatings 12 are in the form of isolated patches arranged in a regular order of rows and columns. A set of parallel sense conductors 13*a*–13*c* overlays each row of films 12. An ultrasonic transducer 14, such as a CdS transducer, and an ultrasonic absorbing termination 15 are on the ends of the substrate 11, as shown in FIGS. 1 and 2. The magnetic film coatings 12 have square-loop properties and are oriented with their easy axes in a direction along the length of the sense conductors 13*a*–13*c*. To enter information serially into the block, a strain wave is launched via a transducer driver 16 along the element 10 and propagates from the transducer end 14 to the termination 15, where it is essentially completely absorbed. As the wave propagates along the substrate 11, it reduces the switching threshold by partially rotating the easy axis of the strained regions of the magnetic films 12. A pulse of current applied to the conductors 13*a*–13*c* by a digit driver 17 causes flux reversal in these strained regions of reduced switching threshold permitting the selective writing of information.

Nondestructive serial retrieval of the stored information may be effected by propagating a strain wave along the substrate 11. This produces a reversible change in the magnetization by momentarily rotating the easy axis of the strained region. This momentary change induces in the linking conductors 13*a*–13*c* a voltage pulse having a polarity which depends on the remnant state of the flux corresponding to the stored information. This voltage pulse may then be detected by a sense amplifier 18.

The novel magnetostrictive elements are comprised of alloy films in the Ni-Fe-Mn alloy system. The useful compositional range of these alloys is defined as follows:

| Material: | Weight percent |
|---|---|
| Ni | Between 40 and 70 |
| Fe | Between 30 and 60 |
| Mn | From 0.1 to 14 |

A range of compositions which provide particularly useful properties for sonic film memory devices is defined as having a Ni:Fe ratio of from 45:55 to 55:45 and containing 1 to 10 weight percent manganese.

A typical magnetostrictive element having an alloy composition: 45.5% Ni; 49.5% Fe; and 5.0% Mn in the form of a thin film having a thickness of about 1500 A. exhibited the following properties:

Anisotropy, unstrained ($H_k°$)—3½ oe.
Coercive force, unstrained ($H_c°$)—5 oe.
Strain ($\Delta l/l$) required for an 87° rotation of the easy axis—$2\times10^{-5}$ (where $l$ is length).

Films having a 90° rotation with strains in the order of $1\times10^{-5}$ have been prepared. The properties of the novel elements are superior to the most strain sensitive pure Ni-Fe films. For example the Ni-Fe films typically have unstrained $H_k$ values of from 7–11 oe., similar $H_c$ values, and require strains in the order of $10^{-4}$ in order to obtain a rotation of from about 50°–70°.

The novel magnetostrictive films typically are single phase alloys and have unstrained $H_k$ values between 2 and 7 oersteds, similar $H_c$ values, and are well oriented, with a square hysteresis loop. Their flux density is generally higher than Ni-Fe-films. In addition, the novel films generally exhibit inversion, i.e. $H_c > H_k$. This is advantageous to insure switching by rotation of the easy axis rather than by wall motion, the former being a faster process. Also strains generally only in the order of $1\times10^{-5}$ to $5\times10^{-5}$ are required to give about 80–90° rotation.

The useful thickness of the films depends upon the geometry of the device. When there is a closed-loop magnetic flux path, such as when the film is properly oriented on the surface of a cylindrical substrate, relatively large film thicknesses may be employed, for example thickness of about 1 micron, because the film does not demagnetize. Where there is an open flux path, demagnetization may occur. The maximum film thickness without demagnetization in an open flux loop geometry depends on the bit size employed. For example, the maximum thickness for a 10-mil diameter dot having a coercive force of 2–3 oe. is about 1000 A. This maximum is larger for higher coercive force alloys. Typical film thicknesses in an open loop geometry are from 300 A.–3000 A. The sense output of the device is generally greater for larger thicknesses.

The particular substrate material is not critical provided it is capable of transmitting sonic energy, and any of the substrates generally employed in the art can be used. Examples of useful substrates include fused quartz, glass, aluminum and sapphire.

The composition of the novel devices may include small quantities of other elements. For example, copper in amounts less than 0.25 weight percent or gold in amounts up to 1 weight percent added to the starting melt in the process of forming the novel films by vacuum evaporation, may enhance inversion by raising $H_c$ more than $H_k$. Inverted films can also be obtained by the addition of a small amount, for example about 1 weight percent silicon oxide to the starting melt. If too large a quantity of the above materials are added, rotation will be inhibited.

Small additions (generally less than 1%) of gold or molybdenum added to the melt tend to stabilize the films and result in a higher yield of superior films. Gadolinium additions tend to increase strain sensitivity.

Novel magnetostrictive elements can be prepared, for example, by vacuum evaporation, sputtering or electrodeposition. Table 1 gives the properties of Ni-Fe-Mn films prepared by serially evaporating a melt having a Ni-Fe weight ratio of 60:40 and including 5% by weight of Mn. Since manganese has a higher vapor pressure than either nickel or iron, it evaporates first. Consequently, the first films produced serially in a run have the highest concentrations of manganese. The first film in a run as shown in the table is often non-magnetic due to the too high concentration of manganese. This effect can be obviated for example by evaporating manganese in a controlled fashion from a separate crucible.

TABLE I

| Film No. | Percent Ni | Fe | Mn | Hk (oe) | Hc(oe) | Strain Δl/l for given rotation | |
|---|---|---|---|---|---|---|---|
| 1 | 23.4 | 28.8 | 47.8 | (1) | | | |
| 2 | 45.5 | 49.5 | 5.0 | 3½ | 5 | $2\times10^{-5}$ | 85° |
| 3 | 47.0 | 48.7 | 4.3 | 4 | 4 | $6\times10^{-5}$ | 80° |
| 4 | 50.0 | 47.7 | 2.3 | 6½ | 7½ | $7\times10^{-5}$ | 75° |
| 5 | 51.2 | 47.1 | 1.7 | 7 | 8 | $8\times10^{-5}$ | 70° |

[1] Non-magnetic.

Further examples typical of novel films are given in Table II.

TABLE II

| Percent Ni | Fe | Mn | $H_k$ | $H_c$ | Strain for a given rotation | |
|---|---|---|---|---|---|---|
| 41.9 | 48.5 | 9.6 | 3 | 8½ | $2\times10^{-5}$ | 85° |
| 48.0 | 49.0 | 3.0 | 6 | 6 | $5\times10^{-5}$ | 85° |
| 52.7 | 46.5 | 0.8 | 9 | 8 | $1.2\times10^{-4}$ | 50° |
| 47.8 | 51.9 | 0.3 | 5½ | 10½ | $4\times10^{-5}$ | 85° |
| 49.2 | 50.6 | 0.2 | 6 | 5½ | $8\times10^{-5}$ | 65° |

Superior films can be achieved by evaporation from a melt consisting of a 60:40 ratio of Ni:Fe containing about 0.1% Mn and 0.5% Mo. It is believed that the molybdenum in the melt acts by gettering impurities so as to prevent their evaporation, thereby resulting in a purer evaporated film.

The conditions for evaporation are as follows: Fused quartz substrates are heated to about 300° C. and held at that temperature for about 2 hours to attain temperature equilibrium. The substrates are positioned about 3 feet from the source melt to minimize variations in thickness of the evaporated film. The source material which is comprised of Ni, Fe, and Mn in the form of chips is held in an alumina crucible and is heated for example by induction heating or electron-beam heating. A magnetic orienting field of 50 oe. is applied during evaporation and cooling of the film subsequent to evaporation. The vacuum during evaporation is in the order of $10^{-6}$ torr.

Figure 3:
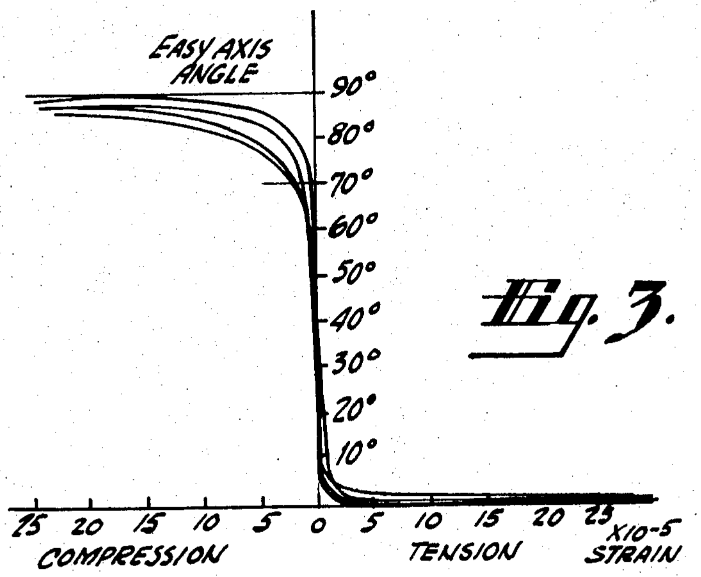
FIG. 3 is a graphical representation of the number of degrees of rotation of the easy axis of novel magnetostrictive elements as a function of applied strain.
Figure 4:
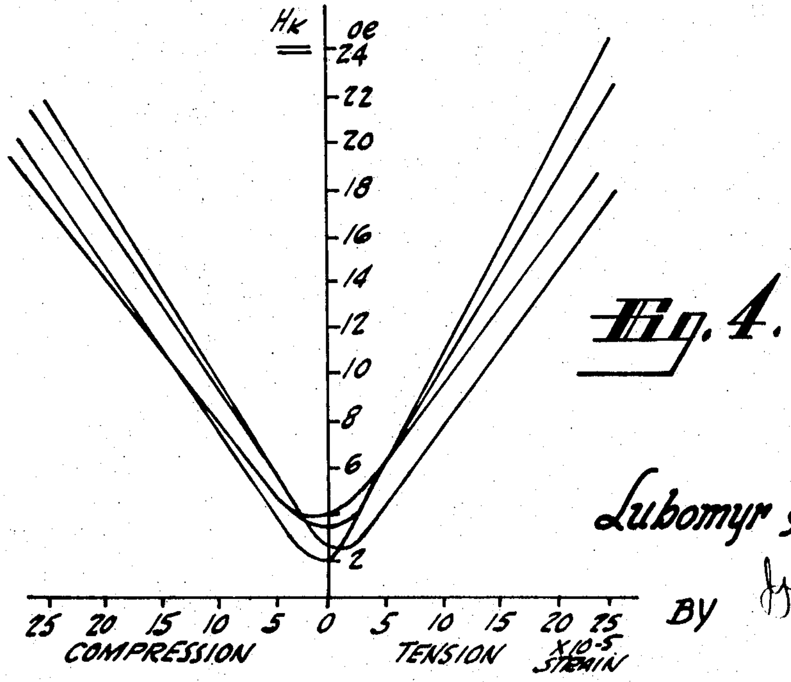
FIG. 4 is a graphical representation of the change in anisotropy of the elements of FIG. 3 as a function of applied strain.

FIGS. 3 and 4 show typical properties of four novel Ni-Fe-Mn films prepared serially from the same melt. The melt was comprised of a 60:40 weight ratio of Ni:Fe and 1.4 weight percent Mn. FIG. 3 is a plot of the rotation of the easy axis, in degrees, as a function of the applied strain. FIG. 4 is a plot of $H_k$ as a function of applied strain. It can be seen from these figures that a change in strain from $1\times10^{-5}$ tension to $1\times10^{-5}$ compression, or a change of only $2\times10^{-5}$, can rotate the easy axis by more than 80°. In addition, FIG. 3 indicates the low values of $H_k$ (2–4 oe.) at zero strain of these films. The effect of the high strain sensitivity and low $H_k$ is to permit a reduction in the required strain amplitude at the film in order to receive a given sense output or to write-in information in the film. This in turn reduces the power requirements of the sonic driver necessary for developing the strain wave. Generally the preferred novel magnetostrictive elements possess a strain sensitivity such that a rotation of the easy axis of at least 50° can be achieved with strains of $5\times10^{-5}$ or less.

The novel elements may be prestressed with a strain in the order of $1\times10^{-5}$ to $2\times10^{-5}$ to optimize the rotation of the easy axis due to applied strain from a strain drive signal source. The desirability of having prestress depends upon the location of the vertical portion of the curve of easy axis rotation versus applied strain. For example, if the curves shown in FIG. 3 were shifted somewhat to the right such that the portions of the curves having the greatest slope were not on the ordinate axis corresponding to zero applied strain, it would be beneficial to prestress such an element in an amount sufficient to shift the curve so that the ordinate and the portion of the curve of greatest slope coincide. In this way only small additionally applied strains will be necessary to obtain a high degree of rotation of the easy axis.

The improved magnetostrictive sensitivity obtained in the novel film as compared to pure Ni-Fe films are not observed when comparing bulk alloys having the same composition as the novel films to bulk Ni-Fe alloys.

I claim:

1. A magnetostrictive element comprising an oriented anisotopic thin film having a thickness of about 1 micron or less of an alloy comprising between 40 and 70 weight percent nickel, between 30 and 60 weight percent iron and from about 0.1 to 14 weight percent manganese.

2. The magnetostrictive element of claim 1 comprised of nickel and iron in a weight ratio of from about 55:45 to 45:55 Ni:Fe and including from about 1 to 10 weight percent Mn.

3. The magnetostrictive element recited in claim 1 having an open-loop flux path and a thickness of from 300 A. to 3,000 A.

4. The magnetostrictive element recited in claim 1 having a closed flux path and a thickness of up to in the order of 1 micron.

5. The magnetostrictive element of claim 1 having an anisotropy field at zero strain of from 2–7 oersteds and a strain sensitivity which causes a rotation of the easy axis of at least 50° with a strain of $5\times10^{-5}$.

6. The magnetostrictive element recited in claim 1 wherein said alloy includes small quantities of a least one member of the group consisting of gold, copper, silicon oxide, and gadolinium.

7. The magnetostrictive element recited in claim 1 wherein said alloy is produced by vacuum evaporation of a melt containing small quantities of molybdenum.

References Cited

UNITED STATES PATENTS

| | | | |
|---|---|---|---|
| 3,067,029 | 12/1962 | Gyorgy et al. | 75—170 |
| 3,206,325 | 9/1965 | Averbach | 117—237X |
| 3,303,117 | 2/1967 | Flur | 148—31.55X |
| 3,399,129 | 8/1968 | Flur et al. | 75—170X |
| 3,472,708 | 10/1969 | Schindler et al. | 148—108 |

FOREIGN PATENTS

| | | | |
|---|---|---|---|
| 761,731 | 11/1956 | Great Britain | 148—108 |
| 944,293 | 12/1963 | Great Britain | 148—108 |

HYLAND BIZOT, Primary Examiner

G. K. WHITE, Assistant Examiner

U.S. Cl. X.R.

75—123, 170; 148—108